United States Patent Office  3,480,463
Patented Nov. 25, 1969

3,480,463
SELF-CROSS-LINKING ACRYLIC RESIN COATING PROCESS AND PRODUCT
David Rankin, Kansas City, Kans., assignor to Gulf Oil Corporation, Pittsburgh, Pa., a corporation of Pennsylvania
No Drawing. Filed Nov. 18, 1964, Ser. No. 412,261
Int. Cl. B44d *1/09, 1/14*
U.S. Cl. 117—62       14 Claims

ABSTRACT OF THE DISCLOSURE

Copolymers of ethylene and selected N-disubstituted amino alkyl esters of acrylic or methacrylic acids are cross-linked by heating said copolymers in an oxygen-containing atmosphere.

---

This invention relates to polymeric materials, and more particularly to cross-linked copolymers of ethylene and N-dialkyl substituted aminoalkyl esters of acrylic and methacrylic acid.

Copolymers of ethylene and N-dialkyl substituted aminoalkyl esters of acrylic acid and methacrylic acid are known, and have been employed for a variety of purposes. However, because of the solubility of these copolymers in water and/or various organic solvents, their use as coatings has been limited. Typical of such copolymers are the water-soluble copolymers, of ethlyene and N-alkyl substituted aminoalkyl esters of acrylic or methacrylic acid, disclosed in U.S. Patent No. 2,625,529 for application as soil conditioning materials.

In contrast to the foregoing, it has been discovered that effective water and solvent resistant coatings can be prepared by a unique cross-linking of copolymers comprised of ethylene and a comonomer selected from the class of N-disubstituted aminoalkyl-esters of acrylic and methacrylic acids into unique cross-linked products. More specifically it was found that these copolymers are self cross-linking when heated, to at least 150° C. and above, in the presence of oxygen, to provide unique cross-linked products having copolymer chains interconnected by cross-linking units formed by a unique alteration of the acrylate comonomer moiety.

Accordingly, it is an object of this invention to provide new and useful compositions of matter.

Another object of this invention is to provide novel cross-linked copolymers of ethylene and N-disubstituted aminoalkyl esters of acrylic or methacrylic acid.

A further object of this invention is to provide a novel process for cross-linking copolymers of ethylene and N-disubstituted aminoalkyl esters of acrylic or methacrylic acid.

It is also an object of this invention to provide novel coating compositions.

A still further object of this invention is to provide a novel process for coating substrates to form thereon a coating of a cross-linked copolymer of ethylene and N-disubstituted aminoalkyl esters of acrylic or methacrylic acid.

Other objects and advantages of this invention will become more apparent from the description of this invention set out below.

More specifically, the invention comprehends heating a copolymer of ethylene and selected N-disubstituted aminoalkyl esters of acrylic or methacrylic acids in an oxygen containing atmosphere to a temperature of at least 150° C. These selected N-disubstituted aminoalkyl acrylate comonomers will have the structure

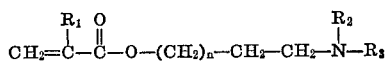

where, generally, $R_1$ is a hydrogen or a methyl radical, $R_2$ and $R_3$ may be the same or different alkyl radicals containing from 1 to 12 carbon atoms, and $n$ is 0 to 10. Preferably $R_2$ and $R_3$ are, individually alkyl radicals containing from 1 to 4 carbon atoms, and $n$ is 0 to 2. For convenience and for purposes of this application these comonomers will be sometimes referred to simply as acrylate esters.

Examples of these comonomers are: N-dimethyl aminoethyl acrylate, N-dimethyl aminoethyl methacrylate, N-diethyl aminoethyl acrylate, N-diethyl aminoethyl methacrylate, N-dipropyl aminoethyl acrylate, N-dipropyl aminoethyl methacrylate, N-dibutyl aminoethyl acrylate, N-dibutyl aminoethyl methacrylate, N-diisobutyl aminoethyl acrylate, N-diisobutyl aminoethyl methacrylate, N-di-t-butyl aminoethyl acrylate, N-di-t-butyl aminoethyl methacrylate, N-ethyl-N-dodecyl aminobutyl acrylate, N-decyl-N-octyl aminododecyl methacrylate, and N-didodecyl aminodecyl acrylate. In any event, and as will be noted, it is essential that the ester contain a tertiary nitrogen and at least a —$CH_2$—$CH_2$— group between the tertiary nitrogen and the carboxyl group.

Copolymerization of the comonomer with ethylene leads to a copolymer containing units having the structure

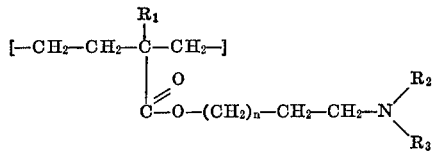

wherein $R_1$, $R_2$, $R_3$ and $n$ have the same significance indicated above for the acrylate esters.

These copolymers can be prepared with a wide range of the chemically combined acrylate ester moiety, ranging, by weight, from about 1 to 5 percent and up to 85 percent, with the upper range representing typical copolymers disclosed in the aforesaid U.S. Patent No. 2,625,529. A further method for carrying out the copolymerization of ethylene with the acrylate ester is mass polymerization at about 16,000 p.s.i. employing an organic peroxide as catalyst.

In a preferred embodiment, the ethylene/acrylate ester copolymers will contain, by weight, from about 1 to 5 percent and up to about 50 percent of the chemically combined acrylate ester moiety. An effective method of preparing these preferred copolymers is disclosed in copending application Serial No.198,769 filed May 31, 1962, by Gerald J. Mantell and Arthur F. Helin, and assigned to the assignee of this application. As disclosed in this copending application, these copolymers are prepared by emulsion copolymerization of ethylene and acrylate ester in an aqueous medium containing t-butanol, a free radical initiator, and either an anionic emulsifier (such as alkali metal salts of sulfates of fatty alcohols and alkali metal salts of ethoxylated fatty alcohols) or a nonionic emulsifier (such as the phenoxy polyoxyethylene glycols). In general, the polymerization will be effected at a temperature from about 70° C. to about 100° C. and a pressure from about 2500 p.s.i. up to about 5000 p.s.i. Normally a temperature of about 85° C. to about 95° C. and a pressure of about 3000 p.s.i. are sufficient. These copolymers are readily coagulated from the emulsion with iso-propanol and hydrochloric acid and isolated for subsequent uses and applications. For more specific details of this method, reference is directed to this copending application which is incorporated herein by reference thereto.

Generally, these preferred ethylene/acrylate ester copolymers, as prepared by the process of this copending application, will have a particle size, in emulsion, of from about 0.02 to about 0.5 micron, and a molecular weight of between 7,000 and 40,000. These copolymers are further characterized by a "Shore D" hardness between about 30 and 40.

Accordingly, the specific amount of the chemically combined acrylate ester moiety in the copolymer is not critical, with the specific amount (including more than 85 percent) depending upon the particular application desired for the ultimate product. Therefore the proportion of ethylene to the acrylate ester, in the copolymer, will be dependent on the ratio of ethylene to acrylate ester desired in the ultimately cross-linked copolymers.

For the cross-linking of these copolymers, the presence of an oxygen containing atmosphere is essential in order for the cross-linking reaction to proceed. Generally the oxygen may comprise, by weight, from at least about 5 percent of the atmosphere up to about 20 percent of the atmosphere. Ambient air which contains about 20 percent oxygen provides a very simple and effective atmosphere for the cross-linking reaction of the copolymers.

As indicated above, temperatures of at least about 150° C. must be used to initiate the cross-linking of the polymers in accordance with this invention. There does not appear to be any upper temperature limit for the cross-linking reaction, other than practical considerations of the thermal properties of the ultimate cross-linked copolymer product and any associated material, for example, various substrates (as when the cross-linked product is coated thereon). In other words, the temperature of thermal decomposition of the cross-linked product and any associated materials. Generally, heating of the copolymer at a temperature of at least 150° C. for 5 minutes will effect the cross-linking of the copolymer, although 10 minutes are normally employed to insure the completeness of the reaction. However, the specific time will vary to some extent depending on the specific acrylate ester chemically combined in the copolymer.

Based on the investigations of the cross-linking process and resultant product (including absence of any C–N absorption frequencies in infra-red studies and presence of an exotherm at about 140° C. in differential thermal analysis studies) it appears that the cross-linking mechanism takes place according to the following scheme, wherein $R_1$, $R_2$, $R_3$ and $n$ have the same significance noted above for the acrylate esters:

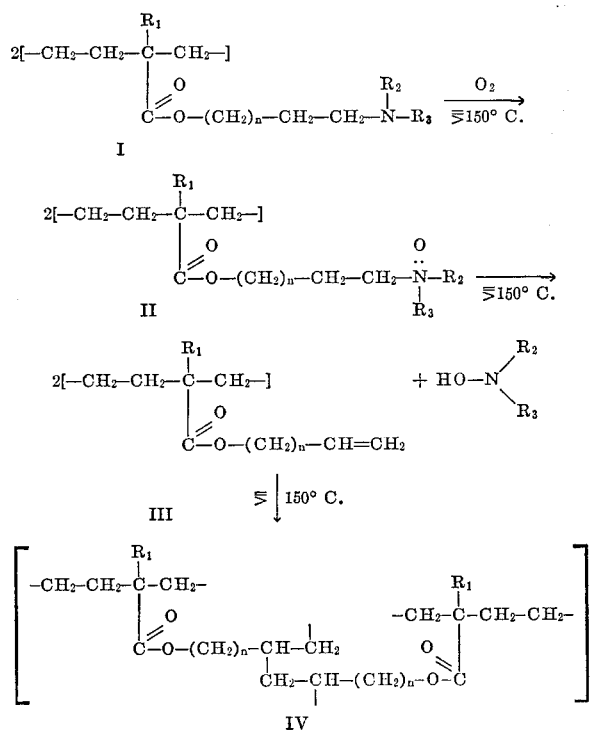

In this series of reactions, as will be noted, the ethylene/acrylate ester copolymer (compound I) reacts with oxygen to form the amine oxide compound II. The amine oxide compound II then decomposes into a dialkyl hydroxyl amine and an olefin unsaturated compound III which cross-links to a like compound III to form compound IV.

These cross-linked products of this invention form effective water and solvent resistant coatings for various substrates. Coatings of the ethylene/acrylate ester copolymer can be applied on the substrate by various conventional techniques. In one method, the ethylene/acrylate ester may be dissolved in a volatile organic solvent, such as tetrahydrofuran and the copolymer cast from solution on the substrate, including removal of the solvent by heating the coated substrate to a temperature and for a time, but below 150° C., to effect the removal of the solvent by volatilization. The dried solvent free coated substrate is then heated to at least 150° C. for a time sufficient to effect the cross-linking of the copolymer coating on the substrate. The ethylene/acrylate ester copolymer solution can be also readily employed for impregnation of various fabrics for various finishing operations such as to impart soft full hand to such fabrics without undue stiffness or rubbery feel, and to improve the tear resistance of such fabrics. The fabrics amenable to treatment include woven and non-woven fabrics of natural or synthetic material, e.g., cotton, wool, polyamide, polyesters, rayon, and the like. In such application, the fabric is impregnated with a volatile organic solution of the ethylene/acrylate ester copolymer by conventional techniques, as by padding, and then dried by heating to volatilize the solvent. Thereafter the fabric is then heated to at least 150° C. for a time sufficient to cross-link the copolymer in accordance with this invention.

Also the copolymer coating can be applied on various substrates by laminating thereon, in conventional manner, an extruded film of the ethylene/acrylate ester copolymer, followed by heating of the coated substrate to at least 150° C. for a time sufficient to effect the desired cross-linking of the copolymer. Where the coating is applied as a film, the copolymer may be modified by the addition of additives for special purposes. For example, slip agents, anti-block agents, dyes, plasticizers, pigments and various fillers such as carbon black, titanium dioxide may be used as modifiers.

In general, these coatings may be employed with substrates of various materials such as textiles, paper, wood, metals, glass, concrete, and various plastics of any desired configuration, including film sheet, tube, rods, filaments and the like. Typical applications of these self-cross-linked copolymers are as pigment binders for paper and textiles, and as sizes for woven and non-woven fabrics.

The following examples, utilizing an ethylene/acrylate copolymer containing 24.5 percent, by weight, of chemically combined N-dimethyl aminoethyl methacrylate, are presented to illustrate the invention, with all percentages and parts specified as percentages by weight.

EXAMPLE I

A treating solution was prepared by dissolving in 100 parts of tetrahydrofuran 4 parts of an ethylene/acrylic ester copolymer containing 24.5 percent of chemically combined N-dimethyl aminoethyl methacrylate. A nonwoven sheet of rayon fleece was impregnated with the solution to deposit in the fabric, by weight thereof, 25 percent of the copolymer. The impregnated sheet of fabric was then dried at 105° C. for sufficient time to remove the solvent by volatilization. The dried sheet was then tested by washing in a Launderometer in accordance with the procedure specified by the American Association of Textile Chemists & Colorists Test No. III A, Standard Test Method 61–1962. On completion of the test it was found that the sheet was completely disintegrated.

EXAMPLE II

Example I was repeated with the added step of heating the impregnated and dried sheet of fabric to 150° C. for 10 minutes, which cross-linked the copolymer deposited on the fabric. This finally treated fabric was tested by washing it in a Launderometer (in accordance with the AATCC III A test). On completion of this test, the dried sheet had soft full hand, excellent shape, substantially no fuzzing, and substantial tear resistance.

EXAMPLE III

Example I was repeated with the added step of heating the impregnated and dried sheet of fabric to 150° C. for 10 minutes which cross-linked the copolymer deposited in the fabric. This treated fabric was then dry cleaned with tetrachloroethylene for one hour at room temperature utilizing twenty ¼" stainless steel balls in a one pint stainless steel Launderometer cylinder rotating at 42 r.p.m. The dry cleaned fabric was characterized by a full soft hand, tear resistance, good shape, and had only very slight fuzzing.

EXAMPLE IV

Three sheets of Mylar were coated with a 1 mil. film of an ethylene/acrylate ester copolymer containing 24.5 percent chemically combined N-dimethyl aminoethyl methacrylate. Each of these coated Mylar sheets were then covered with a second sheet of Mylar to provide three samples in which the superimposed Mylar sheets sandwiched the coating between them. In separate experiments, the superimposed sheets of each sample were pressed together under pressure of 3000 p.s.i. to seal the sandwiched coating from the atmosphere. One sample was heated at 80° C. for three minutes, the second sample was heated at 130° C. for three minutes and the third sample was heated at 180° C. for three minutes. After heating, each of the coated Mylar sheets of each sample was immersed in hot, 120° C., perchloroethylene for about 10 minutes. In each instance the coating on each of the Mylar sheets dissolved in the hot solvent.

EXAMPLE V

A 10" x 6" sheet of Mylar was completely coated by pressing thereon, at 130° C. and 3000 p.s.i., a sufficient amount of a molding powder of an ethylene/acrylate ester copolymer, containing 24.5 percent chemically combined N-dimethyl aminoethyl methacrylate, to provide a 1 mil. coating of the copolymer. The coated Mylar sheet was then cut into ten 1" x 6" samples which were then heated and tested under the conditions specified in the table below:

| Sample | Time heated at 150° C. | Atmosphere | Solubility on 10 minutes immersion in boiling tetrachloroethylene |
|---|---|---|---|
| 1 | 0 | Air (containing oxygen). | Completely soluble. |
| 2 | 10 minutes | do | Insoluble. |
| 3 | 20 minutes | do | Do. |
| 4 | 30 minutes | do | Do. |
| 5 | 1 hour | do | Do. |
| 6 | 2 hours | do | Do. |
| 7 | 3 hours | do | Do. |
| 8 | 0 | Nitrogen (devoid of oxygen). | Completely soluble. |
| 9 | 30 minutes | do | Do. |
| 10 | 2.5 hours | do | Do. |

Although the invention has been described with reference to specific materials, embodiments and details, various modifications, within the scope of this invention, will be apparent to one skilled in the art and are contemplated to be embraced within the invention.

What is claimed is:

1. A process for coating a substrate comprising (a) applying to said substrate a coating of a copolymer of ethylene and a comonomer conforming to the formula

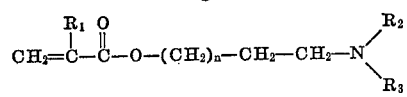

wherein $R_1$ is selected from the group consisting of hydrogen and a methyl radical, $R_2$ is an alkyl radical containing from 1 to 12 carbon atoms, $R_3$ is an alkyl radical containing from 1 to 12 carbon atoms, and $n$ is 0 to 10; and (b) cross-linking said copolymer by heating said coated substrate in an oxygen containing atmosphere to a temperature of at least 150° C. for a time sufficient to form a cross-linked copolymer insoluble in boiling tetrachloroethylene.

2. A process for coating a substrate comprising (a) applying to said substrate a coating of a copolymer of ethylene and a comonomer conforming to the formula

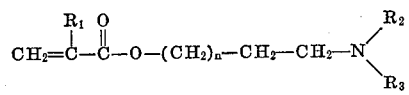

wherein $R_1$ is selected from the group consisting of hydrogen and a methyl radical, $R_2$ is an alkyl radical containing from 1 to 4 carbon atoms, $R_3$ is an alkyl radical containing from 1 to 4 carbon atoms, and $n$ is 0 to 2; and (b) cross-linking said copolymer by heating said coated substrate in an oxygen containing atmosphere to a temperature of at least 150° C. for a time sufficient to form a cross-linked copolymer insoluble in boiling tetrachloroethylene.

3. The process of claim 2 wherein said comonomer is N-dimethyl aminoethyl methacrylate.

4. A process for coating a substrate comprising (a) applying to said substrate a coating composition comprising a volatile organic solvent having dissolved therein a copolymer of ethylene and a comonomer conforming to the formula

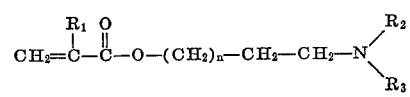

wherein $R_1$ is selected from the group consisting of hydrogen and a methyl radical, $R_2$ is an alkyl radical containing from 1 to 12 carbon atoms, $R_3$ is an alkyl radical containing from 1 to 12 carbon atoms, and $n$ is 0 to 10; (b) heating said coated substrate to a temperature and for a time sufficient to effect removal of said solvent, but below 150° C.; and (c) thereafter heating said solvent free coated substrate in an oxygen containing atmosphere to a temperature of at least 150° C. for a time sufficient to cross-link said copolymer into a cross-linked product insoluble in boiling tetrachloroethylene.

5. A process for coating a substrate comprising (a) applying to said substrate a coating composition comprising a volatile organic solvent having dissolved therein a copolymer of ethylene and a comonomer conforming to the formula

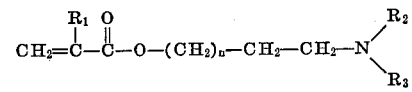

wherein $R_1$ is selected from the group consisting of hydrogen and a methyl radical, $R_2$ is an alkyl radical containing from 1 to 4 carbon atoms, $R_3$ is an alkyl radical containing from 1 to 4 carbon atoms, and $n$ is 0 to 2; (b) heating said coated substrate to a temperature and for a time sufficient to effect removal of said solvent but below 150° C.; and (c) thereafter heating said solvent free coated substrate in an oxygen containing atmosphere to a temperature of at least 150° C. for a time sufficient to cross-link said copolymer into a cross-linked product insoluble in boiling tetrachloroethylene.

6. The process of claim 5 wherein said comonomer is N-dimethyl aminoethyl methacrylate.

7. A process comprising (a) impregnating a fabric with a solution comprising a volatile organic solvent having dissolved therein a copolymer of ethylene and a comonomer conforming to the formula

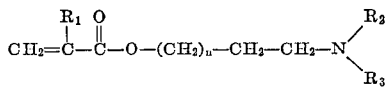

wherein $R_1$ is selected from the group consisting of hydrogen and a methyl radical, $R_2$ is an alkyl radical containing from 1 to 12 carbon atoms, $R_3$ is an alkyl radical containing from 1 to 12 carbon atoms, and $n$ is 0 to 2; (b) heating said impregnated fabric to a temperature and to a time sufficient to effect removal of said solvent, but below 150° C.; and (c) thereafter heating solvent free impregnated fabric in an oxygen containing atmosphere to a temperature of at least 150° C. for a time sufficient to cross-link said copolymer into a cross-linked product insoluble in boiling tetrachloroethylene.

8. The process of claim 7 wherein said fabric is a non-woven rayon fleece.

9. A process comprising (a) impregnating a fabric with a solution comprising a volatile organic solvent having dissolved therein a copolymer of ethylene and a comonomer conforming to the formula

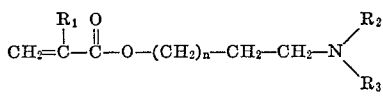

wherein $R_1$ is selected from the group consisting of hydrogen and a methyl radical, $R_2$ is an alkyl radical containing from 1 to 4 carbon atoms, $R_3$ is an alkyl radical containing from 1 to 4 carbon atoms, and $n$ is 0 to 2; (b) heating said solution impregnated fabric to a temperature and for a time sufficient to effect removal of said solvent, but below 150° C.; and (c) thereafter heating said solvent free impregnated fabric in an oxygen containing atmosphere to a temperature of at least 150° C. for a time sufficient to cross-link said copolymer into a cross-linked product insoluble in boiling tetrachloroethylene.

10. The process of claim 9 wherein said fabric is a non-woven rayon fleece.

11. The process of claim 9 wherein said comonomer is N-dimethyl aminoethyl methacrylate.

12. The process of claim 11 wherein said fabric is a non-woven rayon fleece.

13. A substrate having coated thereon a cross-linked copolymer derived from a base copolymer of ethylene and a comonomer conforming to the formula

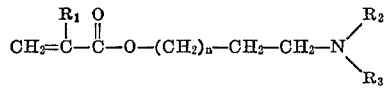

wherein $R_1$ is selected from the group consisting of hydrogen and a methyl radical, $R_2$ is an alkyl radical containing from 1 to 12 carbon atoms, $R_3$ is an alkyl radical containing from 1 to 12 carbon atoms, and $n$ is an integer from 0 to 10; wherein said base copolymer is cross-linked in an oxygen containing atmosphere at a temperature of at least 150° C. for a time sufficient to form a cross-linked product insoluble in boiling tetrachloroethylene.

14. A fabric impregnated with a cross-linked copolymer derived from a base copolymer of ethylene and a comonomer conforming to the formula

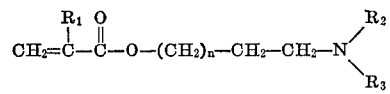

wherein $R_1$ is selected from the group consisting of hydrogen and a methyl radical, $R_2$ is an alkyl radical containing from 1 to 12 carbon atoms, $R_3$ is an alkyl radical containing from 1 to 12 carbon atoms, and $n$ is 0 to 2; wherein said base copolymer is cross-linked in an oxygen containing atmosphere at a temperature of at least 150° C. for a time sufficient to form a cross-linked product insoluble in boiling tetrachloroethylene.

References Cited

UNITED STATES PATENTS

| | | | |
|---|---|---|---|
| 3,240,740 | 3/1966 | Knapp et al. | 117—138.8 |
| 2,491,102 | 12/1949 | Frowde | 117—161 |
| 2,534,078 | 12/1950 | Strain | 260—86.7 |
| 2,625,529 | 1/1953 | Hedrick et al. | 260—2 |
| 3,219,611 | 11/1965 | Witwer | 260—29.6 |
| 3,261,799 | 7/1966 | Vermont | 260—29.6 |

WILLIAM D. MARTIN, Primary Examiner

MATHEW R. P. PERRONE, Jr., Assistant Examiner

U.S. Cl. X.R.

117—132, 138.8, 140, 145, 148, 155, 161; 260—86.7